United States Patent
Yeung et al.

(10) Patent No.: US 6,376,631 B1
(45) Date of Patent: Apr. 23, 2002

(54) PROCESSES TO CONTROL THE RESIDUAL MONOMER LEVEL OF COPOLYMERS OF TERTIARY AMINO MONOMER WITH A VINYL-FUNCTIONAL MONOMER

(75) Inventors: Dominic Wai Kwing Yeung; Leo Zhaoqing Liu; Richard E. Rice, all of Ontario (CA)

(73) Assignee: Rhodia, Inc., Cranbury, NJ (US)

( * ) Notice: Subject to any disclaimer, the term of this patent is extended or adjusted under 35 U.S.C. 154(b) by 7 days.

(21) Appl. No.: 09/670,570

(22) Filed: Sep. 27, 2000

(51) Int. Cl.⁷ .............................................. C08F 126/06
(52) U.S. Cl. ...................... 526/260; 526/258; 526/264; 526/268; 526/312; 526/323.2
(58) Field of Search ................. 526/258, 260, 526/264, 268, 312, 323.2

(56) References Cited

U.S. PATENT DOCUMENTS

| | | |
|---|---|---|
| 3,041,318 A | 6/1962 | Hess |
| 3,046,259 A | 7/1962 | Hess et al. |
| 3,099,636 A | 7/1963 | Skiles |
| 3,249,455 A | 5/1966 | Williams |
| 3,284,393 A | 11/1966 | Vanderhoff et al. |
| 3,658,771 A | 4/1972 | Volk et al. |
| 3,671,502 A | 6/1972 | Samour et al. |
| 3,960,763 A | 6/1976 | Lambou et al. |
| 4,304,703 A | 12/1981 | Das |
| 4,486,489 A | 12/1984 | George |
| 4,528,111 A | 7/1985 | Su |
| 4,556,509 A | 12/1985 | Demangeon et al. |
| 4,579,681 A | 4/1986 | Ruppert et al. |
| 4,713,182 A | 12/1987 | Hiltz et al. |
| 4,734,099 A | 3/1988 | Cyprien |
| 5,027,898 A | 7/1991 | Naae |
| 5,042,583 A | 8/1991 | D'Souza et al. |
| 5,104,643 A | 4/1992 | Grollier et al. |
| 5,169,441 A | 12/1992 | Lauzon |
| 5,218,021 A | 6/1993 | Clark et al. |
| 5,232,632 A | 8/1993 | Woo et al. |
| 5,277,899 A | 1/1994 | McCall |
| 5,338,541 A | 8/1994 | Matz et al. |
| 5,346,699 A | 9/1994 | Tiernan et al. |
| 5,415,860 A | 5/1995 | Beucherie et al. |
| 5,496,475 A | 3/1996 | Jho et al. |
| 5,536,452 A | 7/1996 | Black |
| 5,549,869 A | 8/1996 | Iwakawa |
| 5,580,819 A | 12/1996 | Li et al. |
| 5,587,022 A | 12/1996 | Black |
| 5,612,308 A | 3/1997 | Woo et al. |
| 5,614,473 A | 3/1997 | Dino et al. |
| 5,658,961 A | 8/1997 | Cox, Sr. |
| 5,665,466 A | 9/1997 | Guez et al. |
| 5,686,024 A | 11/1997 | Dahanayake et al. |
| 5,705,033 A | 1/1998 | Gerard et al. |
| 5,706,895 A | 1/1998 | Sydansk |
| 5,714,001 A | 2/1998 | Savoly et al. |
| 5,735,955 A | 4/1998 | Monaghan et al. |
| 5,811,386 A | 9/1998 | Mueller et al. |
| 5,821,203 A | 10/1998 | Williamson |
| 5,853,710 A | 12/1998 | Dehan et al. |
| 5,858,343 A | 1/1999 | Szymczak |
| 5,882,541 A | 3/1999 | Achtmann |
| 5,902,574 A | 5/1999 | Stoner et al. |
| 5,902,778 A | 5/1999 | Hartmann et al. |

FOREIGN PATENT DOCUMENTS

| | | |
|---|---|---|
| EP | 0013585 | 7/1980 |
| EP | 0232092 | 8/1987 |
| EP | 0410567 | 1/1991 |
| EP | 0494554 | 7/1992 |
| EP | 0560519 | 9/1993 |
| GB | 1073947 | 6/1967 |
| JP | 05214392 | 3/1982 |
| JP | 5311194 | 5/1993 |
| JP | 57044700 | 8/1993 |
| WO | 9115524 | 10/1991 |
| WO | 9500611 | 1/1995 |
| WO | 9519951 | 7/1995 |
| WO | 9602622 | 2/1996 |
| WO | 9637597 | 11/1996 |
| WO | 9801478 | 1/1998 |
| WO | 9828393 | 7/1998 |
| WO | 9838973 | 9/1998 |
| WO | 9839401 | 9/1998 |
| WO | 9927053 | 6/1999 |
| WO | 9927054 | 6/1999 |
| WO | 9927057 | 6/1999 |
| WO | 9927058 | 6/1999 |

OTHER PUBLICATIONS

S. Creutz, P. Teyssie, R. Jerome, Living Anionic Homopolymerization and Block Copolymerization of (Dimethylamino)ethyl Methacrylate, Macromolecules, 30, p. 6–9 (1997).

P. Chaumont, D. Colombani, L. Boiteau, J.P. Lamps, M. Zink, C.P.R. Nair, and P. Charmot, Free Radical Synthesis of Functional Polymers Involving Addition–Fragmentation Reactions, American Chemical Society (Chapter 22, p. 362–376) (1998).

(List continued on next page.)

Primary Examiner—Helen L. Pezzuto
(74) Attorney, Agent, or Firm—Stevens, Davis, Miller & Mosher, LLP (57) ABSTRACT

The present invention relates to processes for making polymers from at least one tertiary amino-containing monomer and at least one vinyl-functional monomer, while controlling residual monomers and avoiding production of Michael addition adducts. The process employs one or more of the following steps to avoid such adducts, maintaining at least one tertiary amino-containing monomer and at least one vinyl-functional monomer separate until the polymerization reaction, maintaining the at least one tertiary amino-containing monomer and at least one vinyl-functional monomer free of water until the polymerization reaction, and employing high temperatures for the polymerization reaction. The polymers are useful in personal care products, fabric detergent, hand dishwashing detergent, oil well treating chemicals, fire-fighting foam, agricultural chemicals, flocculants, coagulants, and household cleaners.

37 Claims, 3 Drawing Sheets

OTHER PUBLICATIONS

J. Chiefari, Y. K. Chong, F. Ercole, J. Krstina, J. Jeffrey, T. Le, R. Mayadunne, G. Meijs, C. Moad, G. Moad, E. Rizzardo, S. Thang, Living Free–Radical Polymerization by Reversible Addition–Fragmentation Chain Transfer: The RAFT Process, Macromolecules, 31, p. 5559–5562 (1998).

A. Sebenik, Living Free–Radical Block Copolymerization Using Thio–Iniferters, Prog. Polym. Sci. vol. 23, p. 875–917 (1998).

J. Krstina, C. Moad, G. Moad, E. Rizzardo, A New Form of Controlled Growth Free Radical Polymerization Macromol. Symp. 111, p. 13–23 (1996).

S. Sandler, W. Karo, Organic Chemistry, Polymer Syntheses vol. II, Academic Press N.Y., Chapter 7, Poly(Vinyl Ethers), pp. 214–231 (1974).

V. Butun, N. Billingham, S. Armes, Synthesis and Aqueous Solution Properties of Novel Hydrophilic–Hydrophilic Block Copolymers Based on Tertiary Amine Methacrylates, Chem. Commun. 671–672 (1997).

S. Creutz, J. van Stam, F. De Schryver, R. Jerome, Dynamics of Poly((dimethylamino) alkyl methacrylate–block–sodium Methacrylate) Micelles. Influence of hydrophobicity and Molecular Architecture on the Exchange Rate of Copolymer Molecules, Macromolecules, 31, 681–689 (1998).

A. Lowe, N. Billingham, S. Armes, Synthesis and Characterization of Zwitterionic Block Polymers, Macromolecules, 31, 5991–5998 (1998).

D. Shipp, J.L. Wang, K. Matyjaszewski, Synthesis of Acrylate and Methacrylate Block CoPolymers Using Atom Transfer Radical Polymerization, Macromolecules, 31, 8005–8008 (1998).

X. Zhang, K. Matyjanzewski, Synthesis of Well Defined Amphiphilic Block Copolymers with 2 Dimethylaminoethyl Methacrylate by Controlled Radical Polymerization, Macromolecules 32, 1763–1766 (1999).

N. Hoogeveen, M. Sohen Stuart, G. Fleer, Novel Water–Soluble Block CoPolymers of Dimethylaminoethyl Methacrylate and Dihydroxypropyl Methacrylate, Macromolecules Chem. Phys., 197, p. 2553–2564 (1996).

Viera Vašková, Viera Juraničová, Jaroslav Bartoň, "Polymerization in inverse microemulsions, 1", Makromol. Chem. 191, pp. 717–723 (1990).

PROCESSES TO CONTROL THE RESIDUAL MONOMER LEVEL OF COPOLYMERS OF TERTIARY AMINO MONOMER WITH A VINYL-FUNCTIONAL MONOMER

FIELD OF THE INVENTION

The present invention relates to processes for controlling residual monomers while making copolymers of tertiary amino-monomer and vinyl-functional monomer able to undergo Michael addition.

BACKGROUND OF THE INVENTION

Copolymers of tertiary amino-containing monomers and vinyl-functional monomers are useful in liquid detergent compositions for machine or hand dishwashing. For example, the copolymers are useful to maintain suds in hand dishwashing compositions. Such copolymers are also useful for products in the laundry field for a product having improved grease and soil removal properties, and in products in the personal care field, particularly hand soaps, body washes, shampoos, shaving creams, shaving gels and dephiliatories, which have improved foam retention. There is also a need for such polymers for improved oil field chemicals, agricultural chemicals, fire-fighting foam, detergents, mining chemicals, flocculants and coagulants.

SUMMARY OF THE INVENTION

The present inventors discovered a problem. Namely, they discovered that copolymers of tertiary amino-containing monomers and vinyl-functional monomers formed monomers when heated. The present inventors also discovered the monomers resulted from unstable Michael addition adducts of the copolymers and vinyl-functional monomers which formed during production of the copolymer. The vinyl-functional monomers can be liberated from the adduct under certain conditions to be potentially toxic.

For purposes of this specification and claims, the term copolymer encompasses polymers of two or more different monomers, e.g., bipolymers (two different monomers) or terpolymers (three different monomers).

The present invention solves the aforementioned problem in that it has been surprisingly discovered that these polymeric materials can be made with a negligible amount of undesirable adducts or monomers.

In the present invention, adduct formation is prevented/minimized by performing at least one of the following steps in a process for making copolymers from tertiary amino monomers and vinyl-functional monomers:

1. Avoid formation of adduct by separating the tertiary amino monomer (e.g. dimethylaminoethyl(meth)acrylate) from the vinyl-functional monomer prior to polymerization.

2. Avoid formation of adduct by avoiding contact of water with a mixture of the tertiary amino monomer and the vinyl-functional monomer prior to polymerization.

3. Conduct polymerization at a high temperature (typically about 70 to about 90° C., preferably about 80 to about 90° C.) and at a suitable pH (typically about 3 to about 10, preferably about 4 to about 8, most preferably about 4 to about 6) to cause the adduct formed to be unstable and revert to monomers. Thus, monomers bound by the adduct will be liberated to copolymerize.

Preferably, acid, e.g., mineral acid or citric acid, which is one of the reactants is fed to the reactor before the monomers.

Thus, the present invention provides methods for making compositions for hand dishwashing, personal care, particularly hand soaps, body washes, shampoos, shaving creams, shaving gels and dephiliatories, which have improved foam retention, improved oil field chemicals, agricultural chemicals, fire-fighting foam, detergents, mining chemicals, flocculants and coagulants.

The present process has many advantages. Conventional processes attempt to reduce monomers by employing high initiator concentration and long reaction times. In contrast, the present invention reduces monomer with less initiator and less reaction time than conventional processes for producing low residual monomer polymers. This saves processing time conventionally needed to react residual monomers and saves energy. Also, the present process has a synergistic benefit because the lower concentration of ingredients causes adducts to dissociate faster in the present process.

These and other objects, features and advantages will become apparent to those of ordinary skill in the art from a reading of the following detailed description and the appended claims.

All percentages, ratios and proportions herein are by weight, unless otherwise specified. All temperatures are in degrees Celsius (° C.) unless otherwise specified. All documents cited are, in relevant part, incorporated herein by reference in their entirety.

Additional background on compositions and methods of use is provided by PCT International Application Nos. PCT/US98/24853, PCT/US98/24707, PCT/US98/24699 and PCT/US98/24852, all incorporated herein by reference in their entirety.

DETAILED DESCRIPTION OF THE INVENTION

The present invention relates to processes for producing high purity polymeric materials. High purity polymeric material means copolymers with low levels of residual monomers or adducts. These high purity materials are useful to provide enhanced suds/foam duration and enhanced suds/foam volume when formulated into liquid compositions suitable in the field of hand dishwashing, personal care (particularly for hand washing and/or body washing soaps, shampoo, shaving foam, shaving gel or dephiliatories), agricultural chemicals, e.g., agrochemical foams, oil well chemicals, e.g., oil well foams, fire fighting foams, and home care products, e.g., laundry detergents, shower rinses for bathroom use, and hard surface cleaner foams, mining chemicals, flocculants and coagulants, e.g. coagulants for treatment of titanium dioxide in paper plants. Among their other advantages, they also provide enhanced soil release for laundry detergents for use in washing machines.

I. PROCESS STEPS

The desired reaction is to copolymerize at least one tertiary amino-containing monomer and at least one vinyl-functional monomer to form copolymers rather than Michael addition adducts. In the present process, the vinyl-functional monomers are not substituted by an alkyl group on the 2-position of the vinyl moiety (for example, not methacrylic acid, hydroxyethylmethacrylate or hydroxypropylmethacrylate) because Michael addition adducts do not form if the hydrogen atom was substituted by an alkyl group on the 2-position of the vinyl moiety.

An example of the desired reaction is the following polymerization reaction I of dimethylaminomethyhnethacrylate (a tertiary amino-containing monomer known as DMAEMA) with hydroxyethylacrylate (a vinyl-functional monomer knows as HEA):

However, the present inventors discovered that an undesirable reaction, namely a formation of adducts, can also occur when these monomers are combined. The adduct formation occurs by a Michael addition reaction II as follows:

A small amount of Michael addition adduct may also form by combining one monomer of tertiary amino-containing monomer and one monomer of vinyl-functional monomer as follows in reaction IIA.

The adducts are undesirable because they can liberate monomers under certain conditions. The amount of residual monomers in a commercial polymer product must meet a required, acceptable low level due to potential toxicity. Due to the relative stability of the resulting polymer-adduct at room temperature, the value of residual monomer as measured at room temperature is low. However, the value does not reflect the true amount since the adduct will dissociate upon heating liberating out the bound monomer. Thus, the actual value will be higher. Therefore, the inventors sought processing conditions to essentially eliminate the adduct.

The inventors found use of one or more of the following steps controlled the amount of residual monomers and adduct:

1. Avoid formation of adduct by separating the tertiary amino-containing monomer from the vinyl-functional monomer prior to polymerization.
2. Avoid contacting any mixture of tertiary amino-containing monomer and vinyl-functional monomer with water prior to polymerization. It was found that adduct formation is fast in the presence of water. However, in the absence of water, the formation of adduct is not observed at room temperature.
3. Conduct polymerization at a high temperature (about 70 to about 90° C., preferably about 80 to about 90° C.) and suitable pH (about 3 to about 10, preferably about 4 to about 8, most preferably about 4 to about 6). This destabilizes the adduct formed to liberate the bound monomers from the adduct. The liberated monomers can then copolymerize.

Preferably, acid (a reactant) is supplied to the reactor before the monomers.

Conventionally, copolymers of tertiary amino monomer with a vinyl functional monomer have a Michael addition adduct and monomer level of more than 1000 ppm. With the conditions as defined above, the present invention will be able to control the residual monomer level as desired. For example, the present invention may achieve a residual monomer level below 1000 ppm, preferably below 100 ppm, by weight of copolymer. In other words, the weight ratio of copolymer to the total of residual monomer and adduct can be 1000: less than 1, preferably, 1000: less than 0.1.

Figure 1:
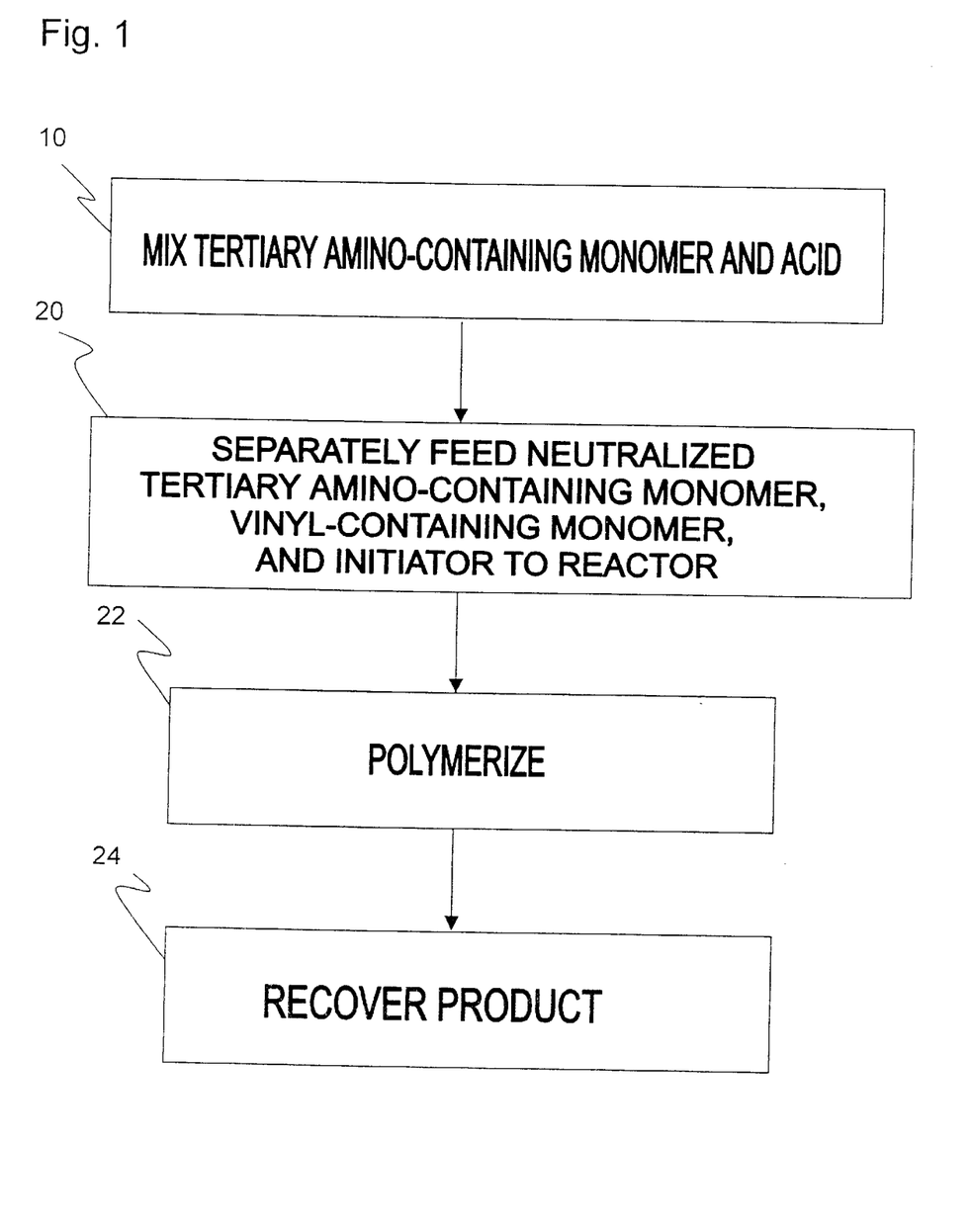
FIG. 1 shows a process flow diagram of a first embodiment of the present invention.

A. Feed Tertiary Amino-containing Monomer Separately From Vinyl-functional Monomer FIG. 1 shows a diagram of a first embodiment of a process of the present invention. Typically this process and other processes described by this specification are performed as semi-batch processes. However, batch or continuous processes are not precluded.

As shown in FIG. 1, a tertiary amino-containing monomer, water, and an acid are mixed in a reactor to form a neutralized tertiary amino-containing monomer mixture (step 10) having a pH of about 3 to about 10. The neutralized tertiary amino-containing monomer mixture, a vinyl-functional monomer, water, and an initiator are fed to the reactor (step 20). The initiator may be a single ingredient (typically sodium persulfate) or a redox system combining an oxidizing component (typically sodium persulfate) and a reducing component (typically sodium metabisulfite). Water is typically fed directly to the reactor with the vinyl-functional monomer and neutralized tertiary amino-containing monomer, and/or with other ingredients.

Generally, the neutralized tertiary amino-containing monomer mixture, a vinyl-functional monomer/water mixture, and initiator are separately fed to the reactor. Preferably, the neutralized tertiary amino-containing monomer mixture, the vinyl-functional monomer/water mixture, at least a portion of the initiator are separately, yet simultaneously, fed to the reactor to form the polymerization mixture. The initiator can be a single organic or inorganic compound or a redox (reduction/oxidation) system of two or more compounds. For example, U.S. Pat. No. 5,863,526, incorporated herein by reference in its entirety, discloses typical initiator systems. The polymerization mixture is maintained in the reactor at polymerization conditions including a pH of about 3 to about 10, preferably about 4 to about 8, most preferably about 4 to about 6, and a temperature of about 70 to about 90° C., preferably about 80 to about 90° C., for a time of about 1 to about 3 hours, to form a copolymer (step 22) and the copolymer product is recovered (step 24).

Figure 2:
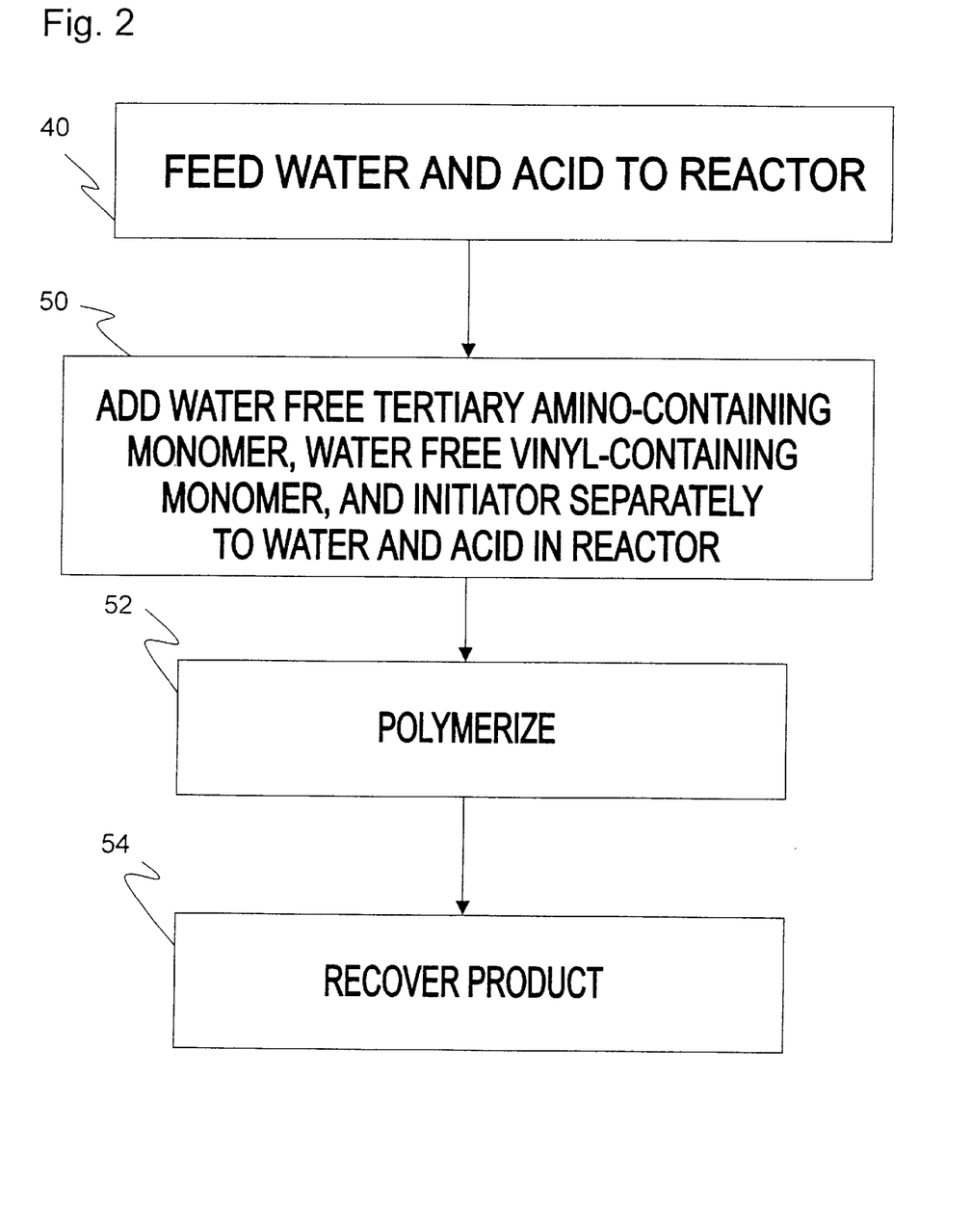
FIG. 2 shows a process flow diagram of a second embodiment of the present invention.

B. Feed Tertiary Amino-containing Monomer and Vinyl-functional Monomer as Separate Water-free Ingredients FIG. 2 shows a second embodiment of the present invention. In the second embodiment, water and acid are fed first to the reactor (step 40). Then, water-free tertiary amino-containing monomer, water-free vinyl-functional monomer and initiator are separately fed to the reactor to admix with the acid and water in the reactor (step 50). In the reactor, the monomers polymerize in the presence of the initiator described above (step 52).

Generally, the water is provided with acid and initiator. The polymerization mixture is maintained at the above-described polymerization conditions to form the copolymer product (step 52). Then the copolymer product is recovered (step 54). If desired, the tertiary amino-containing monomer, the vinyl-functional monomer, and the initiator are separately, yet simultaneously fed to the reactor (step 40).

Figure 3:
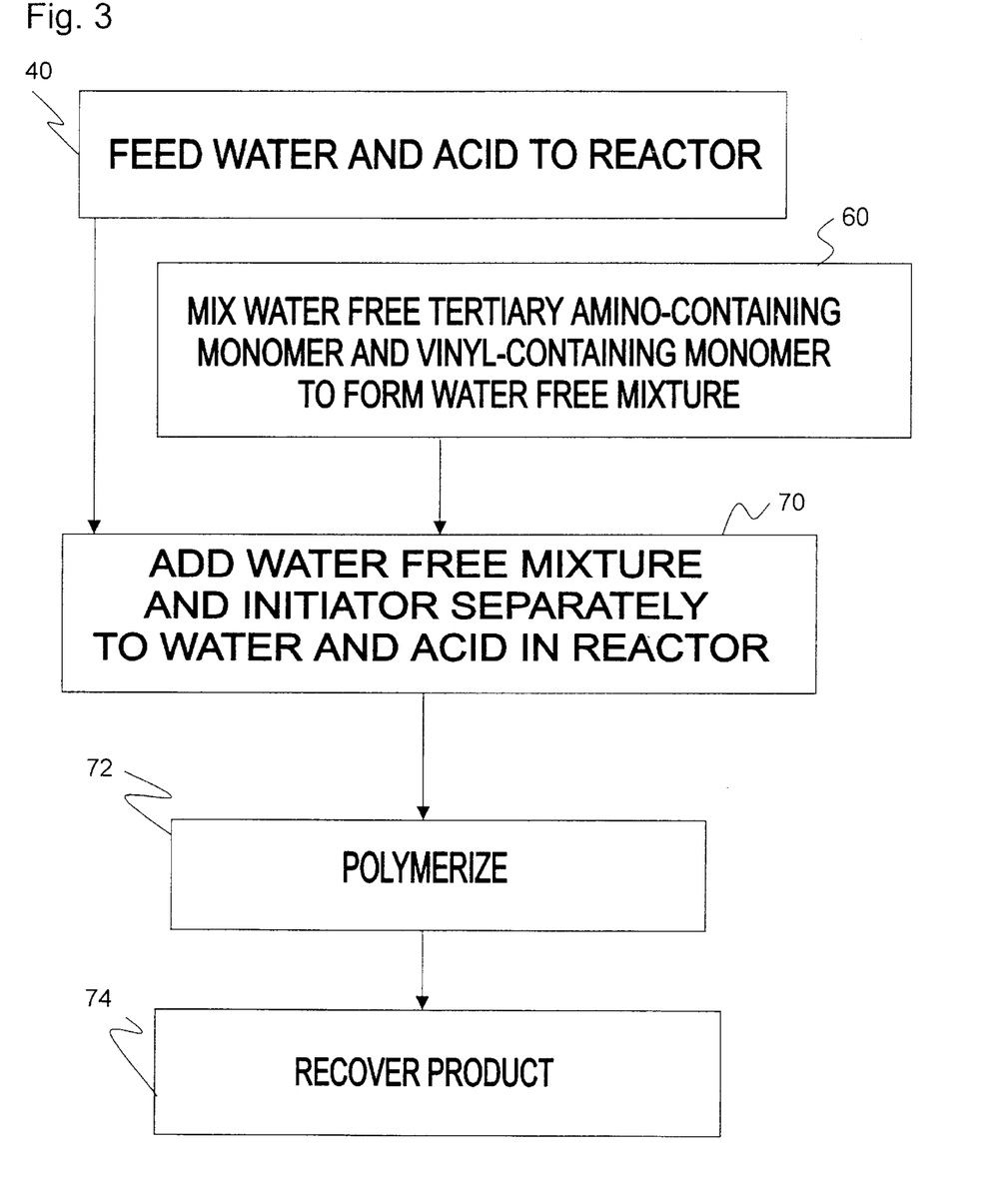
FIG. 3 shows a process flow diagram of a third embodiment of the present invention.

C. Feed Water-free Tertiary Amino-containing Monomer Combined with Water-free Vinyl-functional Monomer FIG. 3 shows a third embodiment of the present invention. This is the same as the second embodiment except that the water-free monomers are mixed to form a water-free mixture prior to being fed to the reactor. It is sometimes desirable to combine streams to simplify processing. Thus, in the process, water and acid are fed first to the reactor (step 40). The tertiary amino-containing monomer and the vinyl-functional monomer stream are mixed to form a water-free monomer mixture (step 60). Then the water-free monomer mixture and initiator are separately fed to the reactor to admix with the acid and water in the reactor (step 70). In the reactor, the monomers polymerize in the presence of the initiator described above at the above-described polymerization conditions (step 72). Then the resulting polymer is recovered (step 74).

Generally, the monomer mixture, the acid, the water, and the initiator are separately fed to a polymerization reactor to form the polymerization mixture. Preferably, the water stream and acid stream are fed first to the reactor, and then, the monomer mixture, and the initiator are separately fed to the polymerization reactor to polymerize (step 72). Typically, at least a portion of the iniator is added at the same time as the monomer mixture. Additional water may be provided with the initiators or separately.

II. COPOLYMER

The above-described processes may be employed to make copolymers from one or more tertiary amino monomers, e.g., dimethylaminomethylmethacrylate (known as DMAEMA), together with one or more vinyl-functionalmonomers, e.g., hydroxyethylacrylate (HEA), hydroxypropylacrylate (HPA), or acrylic acid (AA). For example, one tertiary amino-containing monomer may be mixed with two vinyl-functional monomers, or two tertiary amino-containing monomers may be mixed with one vinyl-functional monomer.

The following describes non-limiting examples of polymeric material for use in the present invention.

The polymers of the present invention may be random or block polymers. For example, the polymeric suds stabilizers of the present invention may have random and/or repeating units, and/or block polymers such as di-, tri- and multi-block polymers.

For example a copolymer can be made from two monomers, G and H, such that G and H are randomly distributed in the copolymer, such as GHGGHGGGGHHG . . . etc.

or G and H can be in repeating distributions in the copolymer, for example

GHGHGHGHGHGHGH . . . etc. or GGGGGH-HGGGGGHH . . . etc.

The same is true of the terpolymer, the distribution of the three monomers can be either random or repeating.

Furthermore, the resulting copolymer has a weight average molecular weight of from about 1,000 to about 2,000,000 typically from about 5,000 to about 1,000,000, more typically from about 10,000 to about 750,000, more typically from about 20,000 to about 500,000, or 35,000 to about 300,000 daltons. The molecular weight of the polymer, can be determined via conventional gel permeation chromatography or any other suitable procedure known to those of ordinary skill in the art.

Additionally, the polymers can be present as the free base or as a salt. Typical counter ions include, acetate, citrate, maleate, sulfate, chloride, etc.

The present description describes the copolymers in terms of their monomeric units. The monomeric units are the repeating units in the polymer. The monomer reactants correspond to the monomer units in that the monomer reactants have a double bond while, in the corresponding monomeric unit, the double bond is opened to form two single bonds for linking the monomeric unit to at least one other monomeric unit.

For example, a typical vinyl-functional monomer is HEA having the structure shown in Formula III:

The monomeric unit corresponding to HEA has the structure shown in Formula IV:

as part of a backbone of a copolymer or the structure shown in formula IVA:

when it is a monomeric unit involved in a Michael addition.

A. Tertiary Amino-Containing Monomers

As stated above, polymers made by processes of the present invention include tertiary amino-containing monomeric units. Thus, the present invention provides a process which employs, as a reactant, one or more tertiary amino-containing monomers of Formula Va:

These tertiary amino-containing monomer of Formula Va correspond to tertiary amino-containing units having the Formula V:

wherein each of $R^1$, $R^2$ and $R^3$ are independently selected from the group consisting of hydrogen, $C_1$ to $C_6$ alkyl, and mixtures thereof, preferably hydrogen, $C_1$ to $C_3$ alkyl, more preferably, hydrogen or methyl. T is selected from the group consisting of substituted or unsubstituted, saturated or unsaturated, linear or branched radicals selected from the group consisting of alkyl, cycloalkyl, aryl, alkaryl, aralkyl, heterocyclic ring, silyl, nitro, halo, cyano, sulfonato, alkoxy, keto, ester, ether, carbonyl, amido, amino, glycidyl, carbanato, carbamate, carboxylic, and carboalkoxy radicals and mixtures thereof. Z is selected from the group consisting of: —$(CH_2)$—, $(CH_2$—$CH$=$CH)$—, —$(CH_2$—$CHOH)$—, $(CH_2$—$CHNR^4)$—, —$(CH_2$—$CHR^5$—$O)$— and mixtures thereof, preferably —$(CH_2)$—. $R^4$ and $R^5$ are selected from the group consisting of hydrogen, $C_1$ to $C_6$ alkyl and mixtures thereof, preferably hydrogen, methyl, ethyl and mixtures thereof; z is an integer selected from about 0 to about 12, preferably about 2 to about 10, more preferably about 2 to about 6. A is $NR^6R^7$ or $NR^6R^7R^8$, wherein each of $R^6$, $R^7$ and $R^8$, when present, are independently selected from the group consisting of H, $C_1$–$C_8$ linear or branched alkyl, alkyleneoxy having the formula:

wherein $R^9$ is $C_2$–$C_4$ linear or branched alkylene, and mixtures thereof; $R^{10}$ is hydrogen, $C_1$–$C_4$ alkyl, and mixtures thereof; y is from 1 to about 10. Preferably, $R^6$, $R^7$ and $R^8$, when present, are independently, hydrogen, or $C_1$ to $C_4$ alkyl. Alternatively, $NR^6R^7$ or $NR^6R^7R^8$ can form a heterocyclic ring containing from 4 to 7 carbon atoms, optionally containing additional hetero atoms, optionally fused to a benzene ring, and optionally substituted by $C_1$ to $C_8$ hydrocarbyl, and/or acetates. Examples of suitable heterocycles, both substituted and unsubstituted, are indolyl, isoindolinyl imidazolyl, imidazolinyl, piperidinyl pyrazolyl, pyrazolinyl, pyridinyl, piperazinyl, pyrrolidinyl, pyrrolidinyl, guanidino, amidino, quinidinyl, thiazolinyl, morpholine and mixtures thereof, with morpholino and piperazinyl being preferred. The units of Formula V have the proviso that at least one of A and T contains a tertiary amino moiety. A structure wherein $NR^6R^7$ or $NR^6R^7R^8$ forms a nitrogen-containing ring is one example of a tertiary amino moiety.

Typical copolymers, made by processes of the present invention, are made from at least one tertiary amino-containing monomer having a Formula VIa:

Each of these monomers corresponds to a tertiary amino-containing monomeric unit having a Formula VI:

wherein in both Formulas VIa and VI,

$R^1$ is H or an alkyl having 1 to 10 carbon atoms, $R^2$ is a moiety selected from the group consisting of wherein $R^3$ is selected from the group consisting of a is an integer from 0 to 16, preferably 0 to 10;
b is an integer from 2 to 10;
c is an integer from 2 to 10;
d is an integer from 1 to 100;
$R^4$ and $R^5$ are independently selected from the group consisting of —H and

$$-R^8-N\begin{matrix}R^9\\R^{10};\end{matrix}$$

wherein $R^8$ is independently selected from the group consisting of a bond and an alkylene having 1 to 18, preferably 1 to 10, carbon atoms, and
$R^9$ and $R^{10}$ are independently selected from the group consisting of —H, alkyl having 1 to 10, preferably 1 to 8 carbon atoms, wherein at least one of $R^4$ and $R^5$ contains a tertiary amino;
$R^{12}$ and $R^{13}$ are independently selected from the group consisting of alkyl having from 1 to 10, preferably 1 to 8 carbon atoms, wherein x is an integer from 2 to 10.

Examples of the tertiary amino-containing unit of Formula VI include, but are not limited to, the following structures:

B. Vinyl-functional Monomers

The present copolymers also contain at least one vinyl-functional monomeric unit. Thus, the present invention provides a process which employs, as a reactant, one or more vinyl-functional monomers. As defined in this specification, a vinyl-functional monomer is a substituted vinyl monomer which has two H atoms at its 1 position and one H atom at its 2 position. Typical vinyl-functional monomers are as shown in Formula VIIa:

VIIa.

This corresponds to vinyl-functional monomeric units as illustrated by Formula VII:

VII, (the one and two positions may be reversed).

In Formula VIIa and VIII, $R^{16}$ is a group that permits the monomer to undergo Michael addition. Typically $R^{16}$ is selected from the group consisting of H, OH, $NH_2$, $NR^{17}R^{18}$, $NHR^{19}$, $NH—(CH_2)_m—NH_2—HCl$, wherein m is an integer from 1 to 25, preferably 2 to 12, $OR^{20}$, alkyl, —O—C(O)—alkyl, and wherein k is an integer from 1 to 25, preferably 1 to 12.

In the substituents of Formula VII and Formula VIIa, each of $R^{17}$, $R^{18}$, $R^{19}$, and $R^{20}$ are independently selected from the group consisting of alkyl, poly(oxyalkylene)-hydroxyalkyl, and hydroxyalkyl. Moreover, in the substituents of Formula VII and Formula VIIa, the alkyls typically have from about one to about thirty-six carbon atoms, more typically about one to about twenty-two carbon atoms, even more typically about 1 to about 4 carbon atoms, and the oxyalkylene groups are typically independently oxyethylene, oxypropylene or oxybutylene groups.

For example, in Formula VII and Formula VIIa $R^{20}$ is typically selected from the group consisting of:

wherein e is an integer from 2 to 25, preferably 2 to 5; or wherein f is an integer from 0 to 25, preferably 0 to 12; or wherein g is an integer from 1 to 100, preferably 1 to 50,
h is an integer from 1 to 100, preferably 1 to 50,
$R^{23}$ is —H, —$CH_3$ or —$C_2H_5$, and
$R^{24}$ is —$CH_3$ or —$C_2H_5$; or
a polyhydroxy monomeric unit of Formula VIII:

VIII wherein n is an integer from 0 to 49, preferably 0 to 24.
In formulas VII and VIIa $R^{19}$ is typically —$(CH_2)_j$—OH wherein j is an integer from 1 to 25, preferably 2 to 12;

Typically, at least one vinyl-functional monomeric unit is selected from the group consisting of:

wherein n is an integer from 2 to 50, preferably 2 to 30, more preferably 2 to 27, In typical copolymers made according to the present invention, the mol ratio of one or more tertiary amino monomeric unit:one or more one vinyl-functional monomeric unit range is 1 to 9:9 to 1.

The present invention is further illustrated by the following examples, provided that no observations or other statements made therein should be construed to limit the invention, unless otherwise expressly indicated in the claims appended hereto. All amounts, parts, percentages, and ratios are expressed in this specification and the claims by weight unless otherwise apparent in context.

EXAMPLES

Procedure

DMAEMA copolymers were prepared from DMAEMA, acid, water, and HEA alone or with AA. The acid was either citric or sulphuric acid.

Unless otherwise indicated, the monomers, acid, water, a sodium persulfate solution and a sodium metabisulfite were added over 2.5 hours at 85° C. to a reaction vessel. The molecular weight of the samples was controlled by the metabisulfite level which varied from 0% to 4.0% based on the active monomer weight. The samples were made using sulphuric or citric acid for neutralization and the active content was 25 to 50%. Typically, monomers and the two components of a redox initiator system were metered over 2.5 hours, held for 1 hour, and then extra initiator was added to further reduce residual monomer, and the resulting mixture was then held for another hour. The reaction temperature was generally about 85° C.

The residual monomer values were measured at room temperature and after heating at 80° C. in a phosphate buffer (pH=4.2) for several hours. The sample after being heated would reveal the amount of monomer that was not polymerized but bound to the polymer.

The residual monomer values were measured with PLC (high pressure liquid chromatography). The polymer concentration of the analyzed samples was 1–5 mg/ml active polymer.

In the following examples % initiator is based on weight percent of the monomers. All residual monomer values are parts per million based on active content (polymer solids).

Comparative Example 1

Adduct Formation of DMAEMA and HEA

The stability of monomer feed of a sulphuric acid neutralized HEA:DMAEMA (6:1) copolymer was studied with time by BPLC. The monomer mixture was 64% active and had a pH of 5.7.

After mixing at room temperature for 2 hours a chromatograph confirmed formation of an adduct of HEA and DMABMA. This adduct was shown to dissociate into the monomers if it was heated at 80° C. in a diluted solution at pH 4.2, indicating the reaction was reversible.

Example 1

Comparative Example 1 was repeated. However, when the two monomers were mixed in neat, little adduct was found over 1 day at room temperature.

Comparative Example 2 and Examples 2–4

Results From HEA:DMAEMA Copolymers Prepared with 4 Feeds

In Comparative Example 2 DMAEMA was neutralized by adding it to acid and water and then HEA was added. Then the monomer mixture and redox initiator components, namely sodium persulfate solution and a sodium metabisulfite solution were separately but at simultaneously added to the reactor over 2 hours. The resulting mixture was held in the reactor for another 1 hour and then extra initiator was added to the reactor. The reaction temperature was 85° C.

In Example 2 an attempt to reduce the complexation of HEA and DMAEMA during polymerization HEA:DMAEMA copolymers was made with two separate monomer feeds. The DMAEMA was neutralized with acid by adding it to citric acid and water. The HEA was diluted with water. The two monomer solutions, and the two components of the initiator system, namely sodium persulfate and sodium metabisulfite solution, were added simultaneously but separately to the reactor over 2.5 hours. Then the mixture was held for 1 hour and extra initiator was added and the resulting mixture was held another hour. The reaction temperature was 85° C.

The separate feeds of Example 2 greatly reduced the total amount of non polymerized AA and HEA. The presence of AA listed in Table 1 was most likely due to the acrylic acid present in the HEA (<1%) raw material as supplied or to a small extent may be due to some hydrolysis of HEA.

A) HEA:DMAEMA (3:1)

The sample of Example 2 prepared with the four feed steams produced a similar product with respect to viscosity, appearance and pH as the sample from Comparative Example 2. The residual monomer values were as shown in TABLE 1. In the following tables, the term ND means less than 0.5 ppm. All residual monomer values are parts per million based on active content (polymer solids).

TABLE 1

| Example No. | Method of Addition | Residual Monomer (Based on Active Polymer) | | | | | | | |
|---|---|---|---|---|---|---|---|---|---|
| | | Room Temperature | | | | 80° C. for 4 Hours | | | |
| | | AA | DMAEMA | HEA | MAA | AA | DMAEMA | HEA | MAA |
| Comparative Ex. 2 | Combined Feed | 21 | ND | 365 | ND | 974 | ND | 3570 | ND |
| Ex. 2 | Separate Feed | 6 | 5 | 92 | ND | 309 | 18 | 1630 | ND |

Further treatment with extra amount of initiator in the four feed method of Example 2 was able to reduce the residual monomer to <500 ppm (when heated at 80° C. for 4 hours).

In the comparative Example 2, the results showed that both AA and HEA values dramatically increased when the sample was heated. This indicates that both monomers were bound to the polymer/adduct and that the actual residual monomer values were much higher than indicated by the value as measured with the pre-heated sample.

Examples 3 and 4 repeat Example 2 but were made with different sodium metabisulfite levels in an attempt to obtain higher and lower molecular weight products. Example 3 prepared with 0.3% metabisulfite formed a gel. Example 4 prepared with twice the sodium metabisulfite (1.2%) produced a lower molecular weight sample. The results are shown in Tables 2A and 2B.

In the Tables of the Examples in this specification under the headings "Residual monomer before further treatment: room temp (80° C./4 hrs)" and "Residual monomer after further treatment:room temp (80° C./4 hrs)", the values outside of parentheses are those in ppm based on active polymer measured at room temperature before heating and the values in parentheses are those in ppm based on active polymer of the analyzed samples after heating to 80° C. for four hours.

The results of these samples were in TABLES 2A and 2B.

TABLE 2A

Results of Several Citric Acid Neutralized HEA:DMAEMA (3:1) Copolymers Prepared With Separate Monomer Feeds

| Example No.[1] | Initiator | Monomer pH | Residual Monomer Before Further Treatment: room temp (80° C./4 hrs) | Residual Monomer After Further Treatment: room temp (80° C./4 hrs) |
|---|---|---|---|---|
| 2 | 1) 2.1% $Na_2S_2O_8$ 2) 0.6% $Na_2S_2O_5$ | DMAEMA = 5.2 HEA = 3.3 | HEA = 6 (309) DMAEMA = 5 (18) AA = 92 (1630) MAA = ND (ND) | HEA = 8 (83) DMAEMA = 8 (ND) AA = 27 (119) MAA = ND (ND) |
| 3 | 1) 2.1% $Na_2S_2O_8$ 2) 0.3% $Na_2S_2O_5$ | DMAEMA = 5.1 HEA = 3.3 | | |
| 4 | 1) 2.1% $Na_2S_2O_8$ 2) 1.2% $Na_2S_2O_5$ | DMAEMA = 5.1 HEA = 3.3 | HEA = 1,164 (3,471) DMAEMA = 14 (14) AA = 38 (308) MAA = 9 (11) | HEA = ND (100) DMAEMA = 7 (6) AA = 2 (92) MAA = 21 (18) |

[1]Synthesis Method: DMAEMA was neutralized by adding it to citric acid and water. HEA was mixed with water. The two monomer mixtures, i.e., DMAEMA (citric) and HEA, and the redox initiator components, namely sodium persulfate solution and sodium metabisulfite solution were metered separately but simultaneously over 2.5 hours. Then the combined ingredients were held for 1 hour and extra initiator was added. Then the combined ingredients were held for another hour. The Reaction Temperature was 85° C. and there was 27.0% active polymer.

TABLE 2B

Results of Several Citric Acid Neutralized HEA:DMAEMA (3:1) Copolymers Prepared With Separate Monomer Feeds

| Example No. | % SOLID (Theoretical Value) | B.V. (As is, 25° C.) | pH (as is, 25° C.) | Appearance |
|---|---|---|---|---|
| 2 | 32.95% | 1070 cps (#31 v, 60 rpm) | 3.95 | Clear yellow solution |
| 3 | | | | Sample gelled and discarded |
| 4 | 33.09% | 175 cps (#21 v, 60 rpm) | 3.35 | Clear liquid |

Comparative Example 3 and Example 5

HEA:DMAEMA (6:1)

HEA:DMAEMA (6:1) copolymers were made with the "four-feed" procedure using sulphuric acid for neutralization. When the DMAEMA and HEA were separated the DMAEMA monomer pH increased to pH 7.0 due to the acidic nature of the HEA (pH 3.3 in water). The pH of the finished product was maintained at about 2.2.

By separating the monomer feeds we were able to substantially reduce the free AA and HEA values. Typical results were as shown in TABLE 3.

TABLE 3

| | | Residual Monomer (Based on Active Polymer) | | | | | | | |
|---|---|---|---|---|---|---|---|---|---|
| | | Room Temperature | | | | 80° C. for 4 Hours | | | |
| Example No. | Method of Addition | AA | DMAEMA | HEA | MAA | AA | DMAEMA | HEA | MAA |
| Comparative Ex. 3 | Combined Feed | 81 | 7 | 975 | ND | 1416 | 11 | 53500 | 14 |
| Ex. 5 | Separate Feed | ND | 14 | ND | ND | 55 | 158 | 1566 | 8 |

Extra treatment with initiator was unable to significantly reduce the residual monomer to as in the HEA:DMAEMA (3:1) case as shown in TABLE 4.

TABLE 4

Treatment with extra initiator

| Reaction Conditions | Dilute in buffer as is | | | | Then 80° C. for ~4 Hrs in buffer | | | |
|---|---|---|---|---|---|---|---|---|
| | AA | DMAEMA | HEA | MAA | AA | DMAEMA | HEA | MAA |
| Finished product overnight | ND | 14 | ND | ND | 55 | 158 | 1945 | 13 |
| 0.05% $Na_2S_2O_8$, hold 1 h at 85° C. | ND | 15 | 2 | ND | 62 | 9 | 1139 | ND |
| 0.05% $Na_2S_2O_8$, hold 1 h at 85° C. | ND | 13 | 2 | ND | 56 | 75 | 949 | 9 |
| 0.2% $Na_2S_2O_5$ and 0.2% $Na_2S_2O_8$ | ND | 5 | ND | ND | 54 | 7 | 890 | 9 |

Extending the addition time from 2.5 hours to 5 hours revealed no improvement in farther reduction in the amount of residual monomer.

When the sample pH was adjusted with sodium hydroxide and treated with extra initiator the residual monomer was reduced to acceptable levels. This is due to a faster dissociation of the monomers from the adduct at a higher pH as shown in TABLE 5.

TABLE 5

Treated with Caustic and Extra Initiator

| Reaction Conditions | Dilute in buffer as is | | | | Then 80° C. for 4 Hrs. in buffer | | | |
|---|---|---|---|---|---|---|---|---|
| | AA | DMAEMA | HEA | MAA | AA | DMAEMA | HEA | MAA |
| Finished product overnight | ND | 14 | ND | ND | 55 | 158 | 1945 | 13 |
| Added 2% NaOH, 0.12% $Na_2S_2O_8$, hold 1 h at 90 C. | 28 | 21 | 211 | — | 80 | 23 | 420 | 10 |
| Added 0.3% NaOH, 0.12% $Na_2S_2O_8$, hold 1 h, then cooling, 0.2% $Na_2S_2O_5$ (at 80 C.) and 0.2% $Na_2S_2O_8$ (60 C.) | ND | 15 | ND | — | 49 | 18 | 31 | 8 |

Examples 6-7 and Comparative Example 4

HEA:DMAEMA (6:1)

Several samples were prepared using the "four-feed" method except citric acid was used instead of sulfuric acid to neutralize the DMAEMA. The citric acid should act as a buffer and help to maintain a steady pH during the reaction. The finished product of higher pH was obtained when citric acid was used instead of sulphuric acid.

Samples prepared with a DMAEMA monomer pH of 7 all formed gels and were discarded. When the DMAEMA pH was about 5 (similar to the 3:1 case) no gelling was observed. Two samples were prepared at 40% and 27% active solid and both possessed similar characteristics to that of the 6:1 copolymer made with the combined feeds. The residual monomer was lower initially after the reaction than the sulphuric acid sample. Both samples were of acceptable residual monomer after being treated with an extra amount of initiator.

The results of these samples are in TABLES 6A and 6B.

TABLE 6A

Results of Citric Acid Neutralized HEA:DMAEMA:(6:1) Copolymers
Prepared with One Feed of Combined Monomers

| Example No.[2] | Monomer pH | Monomer Addition Method | Residual Monomer Before Further Treatment: room temp (80° C./4 hrs) | Residual Monomer After Further Treatment: room temp (80° C./4 hrs) |
|---|---|---|---|---|
| 6 | DMAEMA = 6.9 HEA = 5.7 | DMAEMA (sulfuric) and HEA added Separately | HEA = (1,566) DMAEMA = (151) | HEA = (878) DMAEMA (79) |

TABLE 6A-continued

Results of Citric Acid Neutralized HEA:DMAEMA:(6:1) Copolymers
Prepared with One Feed of Combined Monomers

| Example No.[2] | Monomer pH | Monomer Addition Method | Residual Monomer Before Further Treatment: room temp (80° C./4 hrs) | Residual Monomer After Further Treatment: room temp (80° C./4 hrs) |
|---|---|---|---|---|
| Comparative Ex. 4 | pH = 5.7 | DMAEMA (sulfuric) and HEA added Combined | AA = (18) MAA = (8) | AA = (48) MAA = (8) HEA = (33,760) DMAEMA = (8) AA = (2,314) MAA = (8) |
| 7 | DMAEMA = 5.0 HEA = 3.3 | DMAEMA (citric) and HEA added Separately | HEA = 100 (blb) DMAEMA = ND (8) AA = ND (75) MAA = 8 (8) | HEA = ND (66) DMAEMA = ND (8) AA = ND (25) MAA = 7 (8) |

[2]Synthesis Method: In Examples 6 and 7 DMAEMA was neutralized by adding it to acid and water. HEA was mixed with water. Then the two monomer mixtures and the two redox initiator components were metered over 2.5 hours into a reactor and the resulting mixture was held for 1 hour. Then extra initiator was added and then the mixture was held for another hour.
The reaction temperature was 85° C. The first initiator component was 2.1% $Na_2S_2O_8$ and the second initiator componenent was 1.5% $Na_2S_2O_5$. Comparative Example 4, used the same procedure as Example 6 except the HEA was added to neutralized DMAEMA to form a monomer mixture prior to being fed to a reactor.

TABLE 6B

Results of Citric Acid Neutralized HEA:DMAEMA:(6:1) Copolymers
Prepared with One Feed of Combined Monomers

| Example No. | % active polymer | B.V. (As is, 25° C.) | pH (as is, 25° C.) | Appearance |
|---|---|---|---|---|
| 6 | 40.0% | 167.5 cps (#21 v, 60 rpm) | | Clear liquid |
| Comparative Ex. 4 | 40.0% | 245 cps (#21 v, 60 rpm) | | Clear liquid |
| 7 | 27.0% | 70 cps (#31 v, 60 rpm) | 4.27 | Clear liquid |

Examples 8–10

Polymerization Without Sodium Metabisulfite

Copolymers were made with separate DMAEMA and HEA monomer feeds but sodium persulfate as the sole initiator. This was an attempt to reduce the number of feeds from 3 to 4, and this could be more practical for industrialization. A higher amount of sodium persulfate (6.3%) based on monomer solid was used to account for no metabisulfite use. Copolymers made were with the following compositions:

HEA:DMAEMA (3:1)

HEA:DMAEMA (6:1)

HEA:DMAEMA:AA (6:1:0.33)

All runs were with citric acid neutralized DMAEMA. The 3:1 sample had a lower viscosity than the four-feed method but the other samples have a slightly higher viscosity. The residual monomer values were all comparable to that of the four-feed route and were easily chased down with extra amount of initiator. However, the finish product contains a slight yellow color than that of the previous samples with metabisulfite, and this is as expected.

The results of these samples are in TABLES 7A and 7B.

TABLE 7A

Results of Citric Acid Neutralized HEA:DMAEMA Copolymers Prepared with
Separate HEA and DMAEMA Feeds and no Sodium Metabisulfite

| Example No.[3] | Composition | Monomer pH | Residual Monomer Before Further Treatment: room temp (80° C./4 hrs) | Residual Monomer After Further Treatment: room temp (80° C./4 hrs) |
|---|---|---|---|---|
| 8 | DMAEMA:HEA (1:3) | DMAEMA = 5.2 HEA = 3.3 | HEA = 162 (972) DMAEMA = ND (13) AA = ND (89) MAA = ND (12) | HEA = 95 (276) DMAEMA = ND (13) AA = 10 (63) MAA = ND (12) |
| 9 | DMAEMA:HEA (1:6) | DMAEMA = 5.1 HEA = 3.3 | | HEA = 49 (364) DMAEMA = 8 (7) AA = ND (20) MAA = 8 (7) |
| 10 | DMAEMA:HEA:AA (1:6:0.33) | DMAEMA = 5.1 HEA = 3.3 | HEA = 31 (886) DMAEMA = 6 (6) | HEA = 94 (211) DMAEMA = 7 (6) |

TABLE 7A-continued

Results of Citric Acid Neutralized HEA:DMAEMA Copolymers Prepared with Separate HEA and DMAEMA Feeds and no Sodium Metabisulfite

| Example No.[3] | Composition | Monomer pH | Residual Monomer Before Further Treatment: room temp (80° C./4 hrs) | Residual Monomer After Further Treatment: room temp (80° C./4 hrs) |
|---|---|---|---|---|
| | | | AA = ND (87) | AA = 17 (37) |
| | | | MAA = 4 (4) | MAA = 4 (4) |

[3]Synthesis Method: DMAEMA was neutralized by adding it to citric acid and water. HEA (and AA in Example 10) was mixed with water. Two monomer mixtures and persulfate initiator (6.3% $Na_2S_2O_8$) were metered separately into the reactor over 2.5 hours, and then held for 1 hour. Then extra initiator was added to reduce the residual monomer and the resulting mixture held for another hour. The reaction temperature was 85° C. In Example 10, HEA and AA were mixed to form one of the two monomer mixtures.

TABLE 7B

Results of Citric Acid Neutralized HEA:DMAEMA:Copolymers Prepared with Separate HEA and DMAEMA Feeds and no Sodium Metabisulfite

| Example No. | % SOLID (Theoretical Value) | % active polymer | B.V. (as is, 25° C.) | pH (as is, 25° C.) | Appearance |
|---|---|---|---|---|---|
| 8 | 33.96% | 27.0% | 162.5 cps (#21 v, 60 rpm) | 3.95 | Clear yellow solution |
| 9 | 31.74% | 27.0% | 110 cps (#21 v, 60 rpm) | 3.55 | Clear yellow solution |
| 10 | 31.45% | 27.0% | 80 cps (#21 v, 60 rpm) | 3.35 | Clear yellow solution |

Examples 11–14

Samples Prepared with Citric Acid Added Upfront

Several samples were prepared with three feeds by simultaneously but separately adding the sodium persulfate, sodium metabisulfite and a monomer neat mixture (i.e., the monomers were mixed without neutralizing acid or water). Based on the study of the adduct formation, there is essentially no complexation in the absence of water. Citric acid was added upfront to the reactor to maintain the monomer pH and to prevent hydrolysis of the monomers.

The following copolymers were made:

HEA:DMAEMA (3:1)

HEA:DMAEMA (6:1)

HEA:DMAEMA:AA (6:1:0.33)

This process gave the residual monomer control comparable to that of the four-feed route, and an acceptable level with extra amount of initiator was attained. The samples were of a light yellow color. The degree of color is lighter than that of those samples made without metabisulfite. The 3:1 copolymer had a lower viscosity than that obtained with the four-feed method.

The results of these samples are shown in TABLES 8A and 8B.

TABLE 8A

Results of Several HEA:DMAEMA Copolymers Prepared with a Combined DMAEMA/HEA Feed and Citric Acid Added Up Front

| Example No. | Composition | Residual Monomer Before Further Treatment: room temp (80° C./4 hrs.) | Residual Monomer After Further Treatment: room temp (80° C./4hrs.) |
|---|---|---|---|
| 11[4] | DMAEMA: HEA (1:3) | HEA = 237 (1,046) DMAEMA = ND (9) AA = 3 (149) MAA = ND (7) | HEA = 25 (101) DMAEMA = ND (16) AA = 6 (70) MAA = 11 (ND) |
| 12[4] | DMAEMA: HEA (1:3) | HEA = 121 (1,502) DMAEMA = 5 (9) AA = ND (197) MAA = 5 (5) | HEA = 18 (263) DMAEMA = 3 (5) AA = ND (124) MAA = 3 (2) |
| 13[5] | DMAEMA: HEA (1:6) | HEA = 70 (413) DMAEMA = ND (ND) AA = ND (40) MAA = 9 (ND) | HEA = ND (16) DMAEMA = ND (15) AA = ND (29) MAA = 9 (15) |
| 14[5] | DMAEMA: HEA:AA (1:6:0.33) | HEA = 397 (2,435) DMAEMA = 9 (9) AA = 29 (261) MAA = 14 (10) | HEA = 33 (177) DMAEMA = 6 (7) AA = 16 (91) MAA = 3 (5) |

[4]Synthesis Method: Citric acid and water were added to the reactor. Neat HEA and neat DMAEMA were mixed to form a water-free monomer mixture. The monomer mixture and two initiator components were metered into the reactor over 2.5 hours, then held for 1 hour, and then extra initiator components were added to reduce residual monomer. The resulting mixture was then held for another hour. The initiator components were 1) 2.1% $Na_2S_2O_8$ and 2) 0.6% $Na_2S_2O_5$. The reaction temperature was 85° C. and there was 27.0% active polymer.
[5]Synthesis Method: Citric acid and water were added to the reactor. Neat HEA and neat DMAEMA (and neat AA in Example 14) were mixed to form a water-free monomer mixture. The monomer mixture and two initiator components were metered into the reactor over 2.5 hours, then held for 1 hour, and then extra initiator components were added. The resulting mixture was then held for another hour. The initiator components were 1) 2.1% $Na_2S_2O_8$ and 2) 1.5% $Na_2S_2O_5$. The reaction temperature was 85° C. and there was 27.0% active polymer.

TABLE 8B

Results of Several HEA:DMAEMA Copolymers Prepared with a Combined DMAEMA/HEA Feed and Citric Acid Added Up Front

| Example No. | % SOLID (Theoretical Value) | B.V. (As is, 25° C.) | pH (as, is, 25° C.) | Appearance |
|---|---|---|---|---|
| 11 | 32.99% | 105 cps (#21 v, 60 rpm) | 4.41 | Clear yellow light solution |
| 12 | 32.81% | 77.5 cps (#21 v, 60 rpm) | 4.26 | Clear yellow light solution |
| 13 | 31.12% | 35 cps (#21 v, 60 rpm) | 4.26 | Clear yellow light solution |

TABLE 8B-continued

Results of Several HEA:DMAEMA Copolymers Prepared with a Combined DMAEMA/HEA Feed and Citric Acid Added Up Front

| Example No. | % SOLID (Theoretical Value) | B.V. (As is, 25° C.) | pH (as, is, 25° C.) | Appearance |
|---|---|---|---|---|
| 14 | 31.05% | 37.5 cps (#21 v, 60 rpm) | 3.94 | Clear yellow light solution |

The present invention successfully produces HEA:D-MAEMA copolymers and terpolymers via three different methods and with parameters defined to control the levels of residual monomers. The process with the citric acid added upfront would be preferred simply because it has only 3 feeds and no neutralization step.

Comparative Examples 5–6

HEA:DMAEMA:MAA Samples

Samples of terpolymer were prepared with methacrylic acid, instead of acrylic acid, but showed no improvement with regards to the residual monomer levels as AA and HEA were bonding to the polymer. The results of these samples are shown in TABLES 9A and 9B.

TABLE 9A

Results of Several Citric Acid or Sulfuric Acid Neutralized HEA:DMAEMA:MAA Terpolymers

| Comparative Example No. | Initiator | Monomer pH | Residual Monomer before Further Treatment (based on active solids) Room Temp. (80° C./4 hrs.) | % SOLID |
|---|---|---|---|---|
| 5[6] | 1) 2.1% Na$_2$S$_2$O$_8$ 2) 1.2% Na$_2$S$_2$O$_5$ | 5.12 | HEA = 158 ppm (1,729) DMAEMA = not detected (ND) MAA = not detected (ND) AA = 18 ppm (1,049) | 32.15% |
| 6[7] | 1) 2.1% Na$_2$S$_2$O$_8$ 2) 1.75% Na$_2$S$_2$O$_5$ | 5.29 | HEA = 580 ppm (1,729) DMAEMA = not detected (ND) MAA = not detected (ND) AA = 12 ppm (368) | 54.33% |

[6]Synthesis Method: Neutralized DMAEMA by adding it to citric acid, MAA, water, then added HEA. Metered monomer mixture and the two initiator components over 2.5 hours. Held for 1 hour and added extra initiator components. Held another hour; Reaction Temperature 85° C.; DMAEMA:HEA:MAA (1:3:0.33)

[7]Synthesis Method: Neutralized DMAEMA by adding it to sulphuric acid, MAA, water, then added HEA. Metered monomer mixture and the two initiator components over 2.5 hours. Held for 1 hour and added extra initiator components. Held another hour; Reaction Temperature 85° C.; DMAEMA:HEA:MAA(1:6:0.33)

TABLE 9B

Results of Several Citric Acid or Sulfuric Acid Neutralized HEA:DMAEMA:MAA Terpolymers

| Comparative Example No. | % active polymer | B.V. (As is, 25° C.) | Molecular weight, Mw (Mw/Mn) | pH (as is, 25° C.) | Appearance |
|---|---|---|---|---|---|
| 5 | 27.1% | 620 cps (31 v, 60 rpm) | 113,961 (9.8) | 4.36 | Clear light yellow solution |
| 6 | 50.3% | 3,500 cps (41 v, 60 rpm) | 47,239 (4.9) | 3.78 | Clear light yellow solution |

It should be understood that embodiments other than those specifically disclosed may come the spirit and scope of the present invention. Thus, it is submitted that the present invention is not limited by the foregoing description. Rather the present invention is defined by the claims appended hereto.

We claim:

1. A process for copolymerizing at least one tertiary amino-containing monomer and at least one vinyl-functional monomer comprising the steps of:

mixing the at least one tertiary amino-containing monomer, the at least one vinyl-functional monomer, an acid, and a polymerization initiator in a polymerization reactor to form a polymerization mixture in the reactor, wherein the at least one vinyl-functional monomer has is selected from at least one member of the group consisting of a monomer of Formula VIIa:

VIIa wherein $R^{16}$ is a group which permits the vinyl-functional monomer to undergo Michael addition, copolymerizing the at least one tertiary amino-containing monomer and the at least one vinyl-functional monomer in the polymerization mixture, to form a copolymer comprising at least one corresponding tertiary amino-containing monomer and at least one corresponding vinyl-functional unit, and optionally a Michael addition adduct of the copolymer and the at least one vinyl-functional monomer, and optionally a Michael addition adduct of the at least one tertiary amino-containing monomer and the at least one vinyl-functional monomer;

wherein the process comprises at least one step selected from the group consisting of:

a. maintaining the at least one tertiary amino-containing monomer separate from the at least one vinyl-functional monomer prior to the copolymerizing, b. maintaining the at least one tertiary amino-containing monomer and the at least one vinyl-functional monomer water-free prior to the copolymerizing, and c. conducting the copolymerizing at about 70 to about 90° C. and a pH of about 3 to about 10.

2. The process of claim 1, wherein the copolymerizing occurs at a temperature and pH sufficient to form a composition wherein the ratio of the weight of the copolymer to total of the monomers, vinyl-functional monomeric unit bound to the copolymer by Michael addition, and Michael addition adduct of the vinyl-functional monomer and the tertiary amino-containing monomer is 1,000 parts by weight:less than about 1 part by weight.

3. The process of claim 1, wherein the at least one tertiary amino-containing monomer, the at least one vinyl-functional monomer and the initiator are fed separately to the polymerization reactor.

4. The process of claim 3, wherein the at least one tertiary amino-containing monomer and the at least one vinyl-functional monomer are fed separately, yet simultaneously, to the polymerization reactor.

5. The process of claim 3, wherein the acid is fed to the reactor before the at least one tertiary amino-containing monomer and the at least one vinyl-functional monomer.

6. The process of claim 3, wherein the acid is fed to the reactor separately, yet simultaneously with the at least one tertiary amino-containing monomer and the at least one vinyl-functional monomer.

7. The process of claim 3, wherein the at least one tertiary amino-containing monomer is neutralized with the acid prior to feeding the at least one tertiary amino-containing monomer to the polymerization reactor.

8. The process of claim 3, wherein the acid is combined with the at least one vinyl-functional monomer before feeding the at least one vinyl-functional monomer to the reactor.

9. The process of claim 1, wherein the acid is fed to the reactor separately, yet simultaneously with, the at least one tertiary amino-containing monomer and the at least one vinyl-functional monomer.

10. The process of claim 1, wherein the at least one tertiary amino-containing monomer and the at least one vinyl-functional monomer are water-free when fed to the reactor.

11. The process of claim 10, wherein the at least one tertiary amino-containing monomer, and the at least one vinyl-functional monomer, are combined to form a water-free monomer mixture; and the monomer mixture and the initiator are fed separately, yet simultaneously, to the reactor.

12. The process of claim 10, wherein the at least one tertiary amino-containing monomer, and the at least one vinyl-functional monomer, are combined to form a water-free monomer mixture;

the monomer mixture and the polymerization initiator are separately fed to the polymerization reactor to form the polymerization mixture; and the copolymerizing occurs at a temperature and pH sufficient to form a composition wherein the weight ratio of the copolymer to the total of the monomers, vinyl functional monomeric unit bound to the copolymer by Michael addition, and the Michael addition adduct of the tertiary amine-containing monomer and the vinyl-functional monomer is 1,000:less than about 1.

13. The process of claim 1, wherein acid and water are fed to the reactor prior to feeding the at least one tertiary amino-containing monomer and the at least one vinyl-functional monomer to the reactor.

14. The process of claim 1, wherein the acid comprises citric acid or a mineral acid.

15. The process of claim 1, wherein the at least one tertiary amino-containing monomer and the at least one vinyl-functional containing monomer are copolymerized in the reactor at about 70 to about 90° C. and pH of about 3 to about 10 to form the copolymer and, optionally, the Michael addition adduct.

16. The process of claim 15, wherein the polymerization occurs at a pH of about 4 to about 8.

17. The process of claim 15, wherein the polymerization occurs at a pH of about 4 to about 6.

18. The process of claim 15, wherein the polymerization occurs at a temperature of about 80 to about 90° C.

19. The process of claim 15, further comprising neutralizing the at least one tertiary amino-containing monomer with the acid prior to feeding the at least one tertiary amino-containing monomer to the polymerization reactor.

20. The process of claim 15, wherein the at least one tertiary amino-containing monomer, the at least one vinyl-functional monomer and the initiator are separately, yet simultaneously fed to the polymerization reactor.

21. The process of claim 15, wherein an acid stream is fed to the polymerization reactor separately from the at least one tertiary amino-containing monomer and the at least one vinyl-functional monomer, either prior to or simultaneous with the at least one tertiary amino-containing monomer and the at least one vinyl-functional monomer.

22. The process of claim 15, wherein the at least one tertiary amino-containing monomer and the at least one vinyl-functional monomer are combined to form a monomer mixture, the monomer mixture and the polymerization initiator are separately fed to the polymerization reactor to form the polymerization mixture.

23. The process of claim 15, wherein the at least one tertiary amino-containing monomer, the at least one vinyl-functional monomer, and the polymerization initiator are separately fed to the polymerization reactor to form the polymerization mixture.

24. The process of claim 1, wherein the copolymerizing occurs at a pH of about 4 to about 8.

25. The process of claim 1, wherein the copolymerizing occurs at a pH of about 4 to about 6.

26. The process of claim 1, wherein the copolymerizing occurs at a temperature of about 80 to about 90° C.

27. The process of claim 1, wherein the copolymerizing occurs for about 1 to about 3 hours.

28. The process of claim 1, wherein the acid comprises citric acid or a mineral acid.

29. The process of claim 1, wherein the at least one tertiary amino-containing monomer is selected from at least one member of the group consisting of a monomer of Formula Va:

wherein each of $R^1$, $R^2$ and $R^3$ are independently selected from the group consisting of hydrogen, $C_1$ to $C_6$ alkyl, and mixtures thereof, T is selected from the group consisting of substituted or unsubstituted, saturated or unsaturated, linear or branched radicals selected from the group consisting of alkyl, cycloalkyl, aryl, alkaryl, aralkyl, heterocyclic ring, silyl, nitro, halo, cyano, sulfonato, alkoxy, keto, ester, ether, carbonyl, amido, amino, glycidyl, carbanato, carbamate, carboxylic, and carboalkoxy radicals and mixtures thereof, Z is selected from the group consisting of: —(CH$_2$)—, (CH$_2$—CH=CH)—, —(CH$_2$—CHOH)—, (CH$_2$—CHNR$^4$)—, —(CH$_2$—CHR$^5$—O)— and mixtures thereof, wherein R$^4$ and R$^5$ are selected from the group consisting of hydrogen, C$_1$ to C$_6$ alkyl and mixtures thereof;

z is an integer selected from about 0 to about 12,

A is NR$^6$R$^7$ or NR$^6$R$^7$R$^8$, wherein each of R$^6$, R$^7$ and R$^8$, when present, are independently selected from the group consisting of H, C$_1$–C$_8$ linear or branched alkyl, alkyleneoxy having the formula:

—(R$^9$O)yR$^{10}$, wherein R$^9$ is C$_2$–C$_4$ linear or branched alkylene, and mixtures thereof; R$^{10}$ is hydrogen, C$_1$–C$_4$ alkyl, and mixtures thereof; and y is from 1 to about 10, or NR$^6$R$^7$ or NR$^6$R$^7$R$^8$ form a heterocyclic ring containing from 4 to 7 carbon atoms, optionally containing additional hetero atoms, optionally fused to a benzene ring, and optionally substituted by C$_1$ to C$_8$ hydrocarbyl, and/or acetates, wherein at least one of A and T contains a tertiary amino moiety.

30. The process of claim 1, wherein the at least one tertiary amino-containing monomer is selected from at least one member of the group consisting of a monomer of Formula VIa:

wherein

R$^1$ is H or an alkyl having 1 to 10 carbon atoms,

R$^2$ is a moiety selected from the group consisting of wherein R$^3$ is selected from the group consisting of a is an integer from 0 to 16, preferably 0 to 10;

b is an integer from 2 to 10;

c is an integer from 2 to 10;

d is an integer from 1 to 100;

R$^4$ and R$^5$ are independently selected from the group consisting of —H and wherein R$^8$ is independently selected from the group consisting of a bond and an alkylene having 1 to 18, and

R$^9$ and R$^{10}$ are independently selected from the group consisting of —H, alkyl having 1 to 10, wherein at least one of R$^4$ and R$^5$ contains a tertiary amino moiety;

R$^{12}$ and R$^{13}$ are independently selected from the group consisting of alkyl having from 1 to 10, wherein x is an integer from 2 to 10.

31. The process of claim 1, wherein the at least one vinyl-functional monomer is selected from at least one member of the group consisting of a monomeric unit of Formula VIIa:

wherein R$^{16}$ is selected from the group consisting of H, OH, NH$_2$, NR$^{17}$R$^{18}$, NHR$^{19}$, NH—(CH$_2$)$_m$—NH$_2$—HCl, wherein m is an integer from 1 to 25, OR$^{20}$, alkyl, —O—C(O)-alkyl, and wherein k is an integer from 1 to 25, preferably 1 to 12, wherein each of R$^{17}$, R$^{18}$, R$^{19}$, and R$^{20}$ are independently selected from the group consisting of alkyl, poly(oxyalkylene)-hydroxyalkyl, and hydroxyalkyl, wherein the alkyls have from about one to about thirty-six carbon atoms, and the oxyalkylene groups are independently oxyethylene, oxypropylene or oxybutylene groups.

32. The process of claim 31, wherein the alkyls have from about one to about twenty-two carbon atoms.

33. The process of claim 32, wherein the alkyls have from about 1 to about 4 carbon atoms.

34. The process of claim 31, wherein the at least one vinyl-functional monomeric unit is selected from at least one member of the group consisting of a monomeric unit of Formula VIIa wherein $R^{20}$ is selected from the group consisting of:

wherein e is an integer from 2 to 25;

wherein f is an integer from 0 to 25;

wherein g is an integer from 1 to 100,
h is an integer from 1 to 100,
$R^{23}$ is —H, —CH$_3$ or —C$_2$H$_5$,
$R^{24}$ is —CH$_3$ or —C$_2$H$_5$; and
a polyhydroxy monomeric unit of Formula VIII:

VIII wherein n is an integer from 0 to 49; and $R^{19}$ is

—(CH$_2$)$_j$—OH, wherein j is an integer from 1 to 25.

35. The process of claim 1, wherein the tertiary amino-containing monomer is at least one member of the group consisting of dimethylaminomethacrylate, and dimethylaminopropyl(meth)acrylamide, and the vinyl-functional monomer is selected from at least one member of the group consisting of hydroxyethylacrylate, hydroxyethylmethacrylate, hydroxypropylacrylate, hydroxypropylmethacrylate, and acrylic acid.

36. The process of claim 1, wherein the at least one vinyl-functional containing monomer comprises a member of the group consisting of hydroxyethylacrylate, hydroxypropylacrylate, and acrylic acid.

37. The process of claim 1, wherein
the at least one tertiary amino-containing monomer, the at least one vinyl-functional monomer, and the polymerization initiator are separately fed to a polymerization reactor to form a polymerization mixture;
the at least one tertiary amino-containing monomer and the at least one vinyl-functional containing monomer are copolymerized in the polymerization mixture to form the copolymer and, optionally, the Michael addition, at a temperature and pH sufficient to form a composition wherein the ratio of the weight of the copolymer to total of the monomers, vinyl-functional monomeric unit bound to the copolymer by Michael addition, and Michael addition adduct of the vinyl-functional monomer and the tertiary amino-containing monomer is 1,000,000 parts by weight:less than about 1,000 parts by weight.

* * * * *